(12) United States Patent
Furth et al.

(10) Patent No.: US 8,586,224 B2
(45) Date of Patent: Nov. 19, 2013

(54) BATTERY POWERED DEVICE HAVING A PLURALITY OF SELECTABLE CIRCUITS FOR PROVIDING POWER

(75) Inventors: David A Furth, Skaneateles, NY (US); Mark A Ferguson, Memphis, NY (US)

(73) Assignee: Eveready Battery Co, Inc., St. Louis, MO (US)

( * ) Notice: Subject to any disclaimer, the term of this patent is extended or adjusted under 35 U.S.C. 154(b) by 1039 days.

(21) Appl. No.: 12/364,839

(22) Filed: Feb. 3, 2009

(65) Prior Publication Data
US 2009/0135588 A1 May 28, 2009

Related U.S. Application Data

(63) Continuation of application No. 11/338,985, filed on Jan. 25, 2006, now Pat. No. 7,514,172.

(51) Int. Cl.
*H01M 2/24* (2006.01)
*F21L 4/00* (2006.01)

(52) U.S. Cl.
USPC ............................................. 429/97; 362/202

(58) Field of Classification Search
USPC .................................. 362/200–206
See application file for complete search history.

(56) References Cited

U.S. PATENT DOCUMENTS

| | | |
|---|---|---|
| 1,513,437 A | 10/1924 | Vorhees |
| 1,598,666 A | 9/1926 | Vorhees |
| 2,752,441 A | 6/1956 | Frank |
| 3,345,489 A | 10/1967 | Kemnitz |
| 3,652,846 A | 3/1972 | Starck, II |
| 3,711,699 A | 1/1973 | Bacevius |
| 3,743,915 A | 7/1973 | Struck |
| 4,000,403 A | 12/1976 | Rice |
| 4,025,743 A | 5/1977 | Oswald |
| 4,250,446 A | 2/1981 | Ponte |
| 4,431,717 A | 2/1984 | Kikuchi |
| 4,504,889 A | 3/1985 | Goldfarb |
| 4,607,207 A | 8/1986 | Bruneau |
| 4,905,129 A | 2/1990 | Sharrah |
| 5,167,447 A | 12/1992 | Gonzales |
| 5,239,451 A * | 8/1993 | Menke et al. ................. 362/199 |
| 5,299,375 A | 4/1994 | Thummel et al. |
| 5,471,777 A | 12/1995 | McDonald |
| 5,590,951 A | 1/1997 | Matthews |
| 5,629,105 A | 5/1997 | Matthews |
| 5,909,062 A | 6/1999 | Krietzman |
| 6,046,572 A | 4/2000 | Matthews et al. |
| 6,222,138 B1 | 4/2001 | Matthews et al. |

(Continued)

FOREIGN PATENT DOCUMENTS

| | | |
|---|---|---|
| DE | 1736669 | 12/1956 |
| DE | 146135 A1 | 1/1981 |

(Continued)

*Primary Examiner* — Maria J Laios
(74) *Attorney, Agent, or Firm* — Russell H. Toye, Jr.

(57) ABSTRACT

A battery powered device comprising a housing having a battery compartment apparatus disposed therein, with the battery compartment apparatus being configured to accept at least one battery. The battery compartment apparatus comprises a battery carrier and a locking hold down mechanism. The carrier is slidably mounted in the housing. The locking hold down mechanism responds to insertion and withdrawal of the carrier into and out of the housing by locking the locking hold down mechanism against the battery, thereby preventing undesired displacement of the battery within the housing.

16 Claims, 7 Drawing Sheets

(56) References Cited

U.S. PATENT DOCUMENTS

| | | |
|---|---|---|
| 6,276,088 B1 | 8/2001 | Matthews et al. |
| 6,378,237 B1 | 4/2002 | Matthews et al. |
| D496,482 S | 9/2004 | Osiecki et al. |
| 6,942,359 B2 | 9/2005 | Furth et al. |
| 7,091,694 B1 * | 8/2006 | Barton .......................... 320/110 |

FOREIGN PATENT DOCUMENTS

| | | |
|---|---|---|
| DE | 10004220 A1 | 8/2001 |
| FR | 2499319 A1 | 8/1982 |
| GB | 2269475 A | 2/1994 |
| JP | 09082295 A | 3/1997 |
| WO | 2005/010429 A | 2/2005 |

* cited by examiner

BATTERY POWERED DEVICE HAVING A PLURALITY OF SELECTABLE CIRCUITS FOR PROVIDING POWER

FIELD OF THE INVENTION

The present invention concerns battery powered devices.

BACKGROUND OF THE INVENTION

Battery powered devices can be any device that is powered by batteries. Examples of battery powered devices include toys, flashlights, power tools, medical instruments, camping equipment, tape recorders, personal care instruments, battery powered toothbrushes or any other device that is powered by batteries.

Heretofore, battery powered devices have been powered by a set number of popular alkaline cells of the generally cylindrical shape commercially available in industry-recognized, standard sizes, including D-, C-, AA-, AAA-, and AAAA-size cells. The set number can include one or more of the alkaline cells. Typically, the battery powered devices can only use one configuration of batteries to power the device. For example, a flashlight is typically powered by either two or more AA- or AAA-size cells. However, these battery powered devices will not work if a different size cell is placed therein. For example, if a flashlight is configured to accept AA-size cells therein to power the device, AAA-size cells will not work to power the device.

Accordingly, an improved battery powered device that works with a variety of differently sized cells is desired.

SUMMARY OF THE INVENTION

One aspect of the present invention is to provide a battery powered device comprising a housing having a battery compartment apparatus disposed therein, with the battery compartment apparatus being configured to accept at least one battery. The battery compartment apparatus comprises a battery carrier and a locking hold down mechanism. The battery carrier is slidably mounted in the housing. The locking hold down mechanism is configured to respond to insertion and withdrawal of the battery carrier into and out of the housing by locking the locking hold down mechanism against the at least one battery, thereby preventing undesired displacement of the at least one battery within the housing.

Another aspect of the present invention is to provide a process for securing at least one battery in a housing of a battery device. The process comprises providing a battery powered device comprising a battery compartment apparatus disposed therein, with the battery compartment apparatus comprising a battery carrier and a locking hold down mechanism. The process also includes exposing a portion of the battery carrier by sliding out a portion of the battery carrier from the housing and inserting the at least one battery into the battery carrier. The process further includes sliding the battery carrier and the at least one battery contained therein into the housing. The locking hold down mechanism contains the battery and prevents undesired displacement of the battery within the housing.

Yet another aspect of the present invention is to provide a battery powered device comprising a housing having a battery compartment apparatus disposed therein. The battery compartment apparatus has at least one battery therein. The battery compartment apparatus comprises a battery carrier and a locking hold down mechanism. The battery carrier is slidably mounted in the housing. The locking hold down mechanism responds to insertion and withdrawal of the battery carrier into and out of the housing by locking the locking hold down mechanism against the at least one battery, thereby preventing undesired displacement of the at least one battery within the housing.

Another aspect of the invention provides a device having a housing, a first circuit, and a second circuit. The first circuit is coupled to upper contacts and corresponds to a first battery size. The second circuit is coupled to lower contacts and corresponds to a second battery size. Power is received from one of the first circuit and the second circuit.

These and other features, advantages, and objects of the present invention will be further understood and appreciated by those skilled in the art by reference to the following specification, claims and appended drawings.

DETAILED DESCRIPTION OF THE PREFERRED EMBODIMENTS

Figure 1:
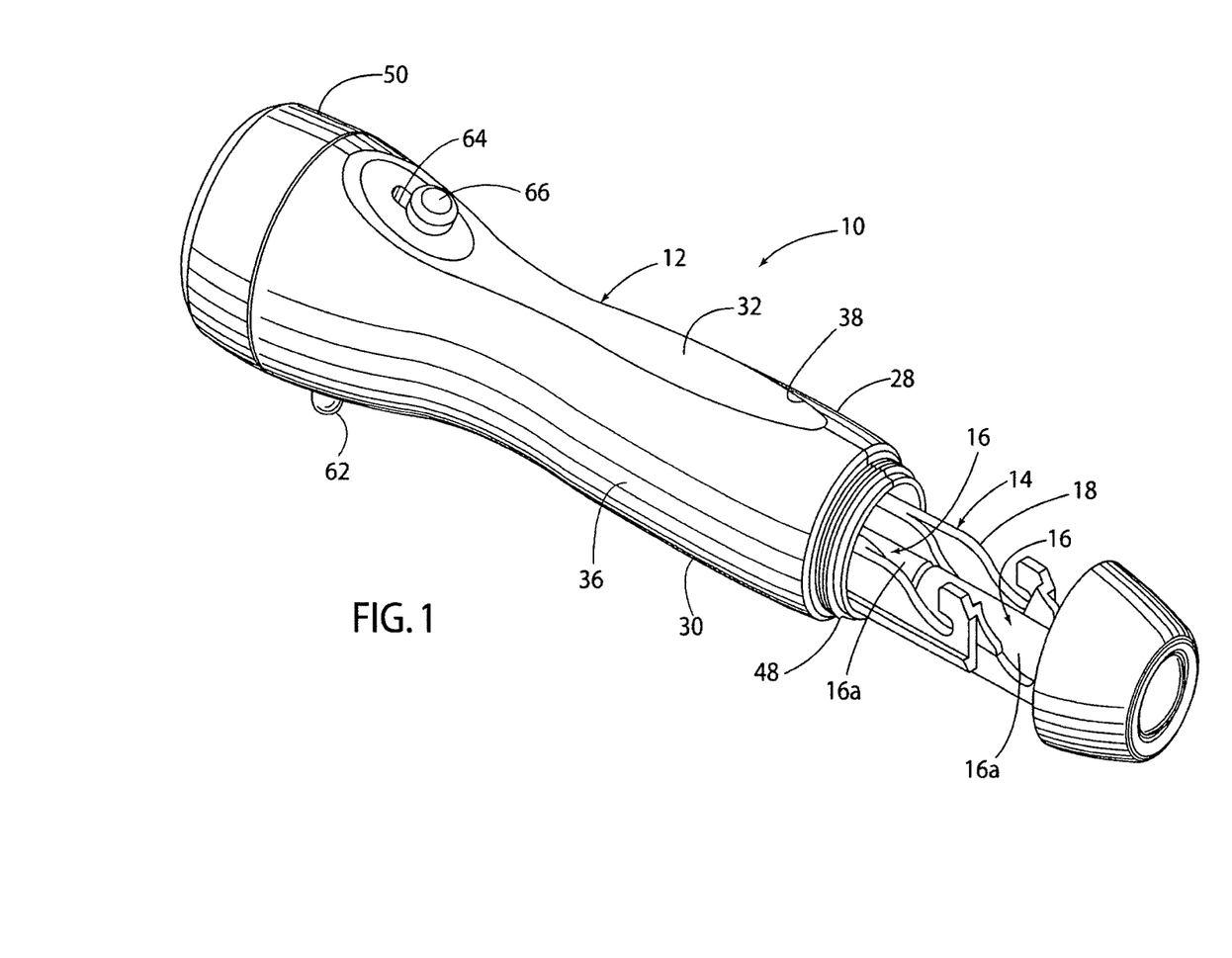
FIG. 1 is an isometric view of the battery powered device of the present invention in a loading position.
Figure 2:
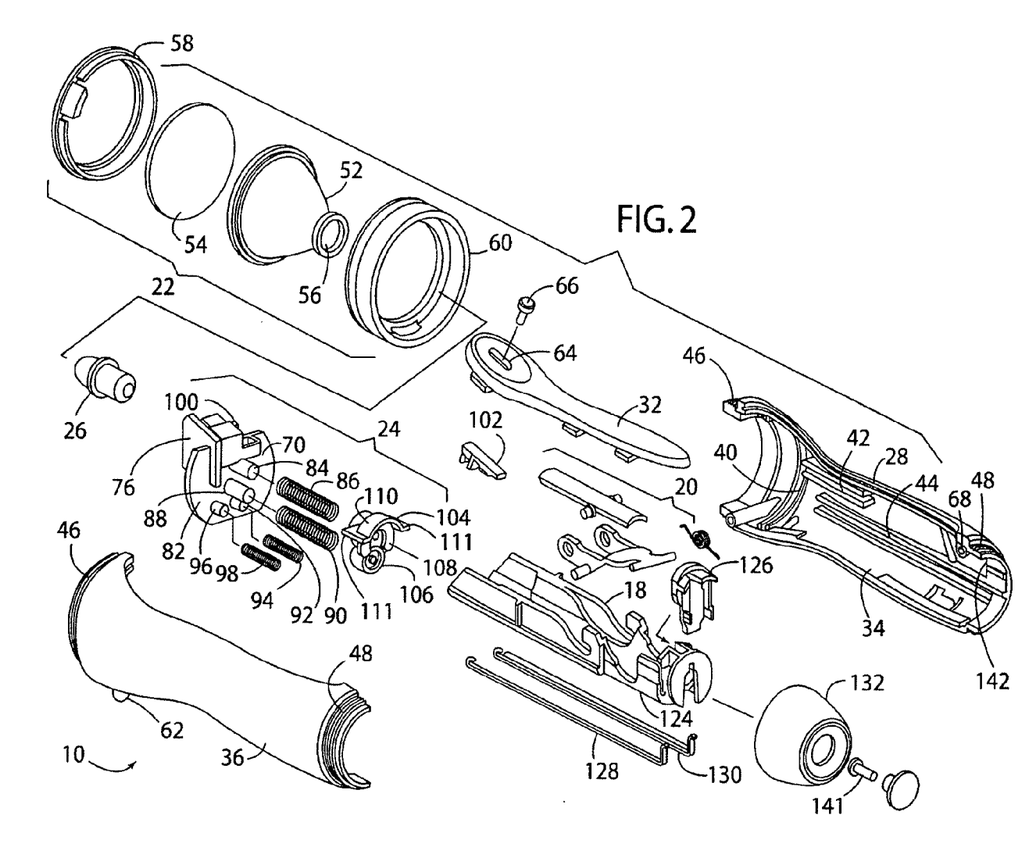
FIG. 2 is an exploded isometric view of the battery powered device of the present invention.
Figure 2A:
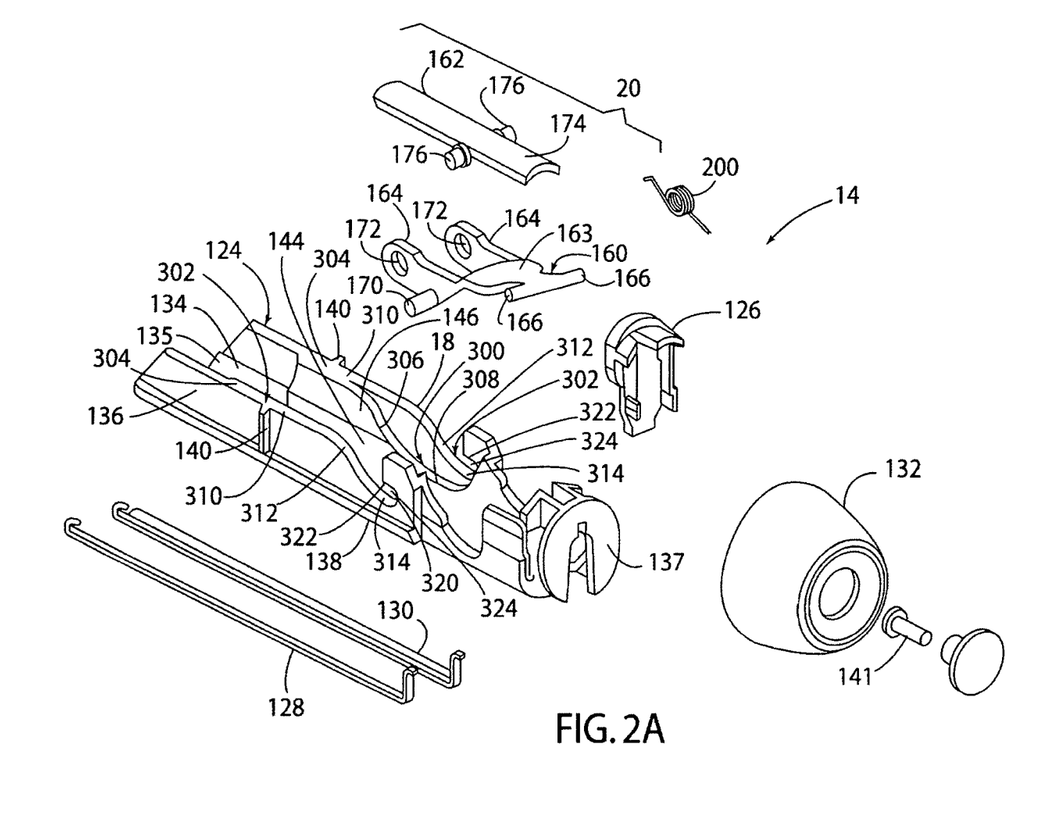
FIG. 2A is an exploded isometric view of a battery compartment apparatus of the battery powered device of the present invention.

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference number 10 (FIGS. 1-5) generally designates a battery powered device of the present invention. The battery powered device 10 comprises a housing 12 having a battery compartment apparatus 14 disposed therein, with the battery compartment apparatus 14 being configured to accept at least one battery 16. The battery compartment apparatus 14 comprises a battery carrier 18 and a locking hold down mechanism 20. The battery carrier 18 is slidably mounted in the housing 12. The locking hold down mechanism 20 is configured to respond to insertion and withdrawal of the battery carrier 18 into and out of the housing 12 by locking the locking hold down mechanism 20 against the at least one battery 16, thereby preventing undesired displacement of the at least one battery 16 within the housing 12.

The illustrated battery powered device 10 of the present invention is configured to alternatively have at least two different types of batteries 16 located therein for powering the battery powered device 10. For example, the battery powered device 10 can have batteries 16 of a number of popular alkaline cells of the generally cylindrical shape commercially available in industry-recognized, standard sizes, including D-, C-, AA-, AAA-, and AAAA-size cells. In the illustrated embodiment, the battery powered device 10 is configured to have AAA-sized batteries 16a (FIGS. 1, 3, 5, 8 and 9) and AA-sized batteries 16b (FIGS. 4, 6 and 7) therein. Accordingly, in the illustrated embodiment, the AAA-sized batteries 16a are of a first size, are tubularly shaped, have a first length and have a first diameter. Likewise, the AA-sized batteries 16b are of a second size, are tubularly shaped, have a second length and have a second diameter. The first diameter is smaller than the second diameter. The first sized batteries are used in a first circuit and the second sized batteries are used in a second circuit in the battery powered device 10 to power the battery powered device 10.

The battery powered device 10 of the present invention can be any device that is powered by batteries. For example, the battery powered device 10 can be a toy, a flashlight (as illustrated herein), a power tool, a medical instrument, camping equipment, a tape recorder, a personal care instrument, a battery powered toothbrush or any other device that is powered by batteries.

In the illustrated example, the battery powered device 10 is a flashlight comprising the housing 12 having the battery compartment apparatus 14 slidably accepted therein. The battery powered device 10 also includes a lamp enclosure 22 and a switch assembly 24 (see FIG. 2). After the batteries 16 are inserted into the battery compartment apparatus 14 and the battery compartment apparatus 14 is fully inserted into housing 12, the switch assembly 24 is activated to power a lamp 26 using the power of the batteries 16 through either the first circuit or the second circuit. Furthermore, the locking hold down mechanism 20 is configured to respond to insertion and withdrawal of the battery carrier 18 into and out of the housing 12 by locking the locking hold down mechanism 20 against the at least one battery 16, thereby preventing undesired displacement of the at least one battery 16 within the housing 12.

The illustrated housing 12 (FIGS. 1-2) comprises a first housing shell 28, a second housing shell 30 and a top cover 32. The first housing shell 28 and the second housing shell 30 are substantially mirror images of each other and are configured to fit together to form a substantially cylindrical interior surface 34 and exterior surface 36 of the housing 12, except for a top opening 38 (see FIG. 3). The top cover 32 fits securely into the top opening 38 when the first housing shell 28 and the second housing shell 30 are connected together. Furthermore, the top cover 32 includes a slot 64 accepting a slide tab 66 therethrough. The slide tab 66 allows a user to the battery powered device 10 to turn the battery powered device 10 on and off by closing either the first circuit (with the second circuit open), by closing the second circuit (with the first circuit open) or by opening both circuits (i.e., powered off). The first housing shell 28 and the second housing shell 30 each include a foot 62 (see FIG. 1) for allowing the housing 12 to rest on a surface without rolling. Although a three-piece cylindrical housing is described herein, it is contemplated that the housing 12 could have any cross-sectional shape and could be formed of any number of parts (including one integral piece).

In the illustrated example, the housing 12 has the switch assembly 24 and the battery compartment apparatus 14 at least partially located therein. The interior surface 34 of the housing 12 includes a tubular groove 40 for accepting the switch assembly 24 in the housing 12 to firmly secure the switch assembly 24 therein. The interior surface 34 also includes a first set of parallel channels 42 for allowing a portion of the switch assembly 24 to slide therein and a second set of parallel channels 44 for allowing the battery carrier 18 of the battery compartment apparatus 14 to slide therein as discussed in more detail below. Furthermore, the interior surface 34 includes a pair of co-linear pivot openings 68 configured to accept a portion of the locking hold down mechanism 20 therein. The exterior surface 36 of the housing 12 includes a first end outside thread 46 and a second end outside thread 48.

Figure 3:
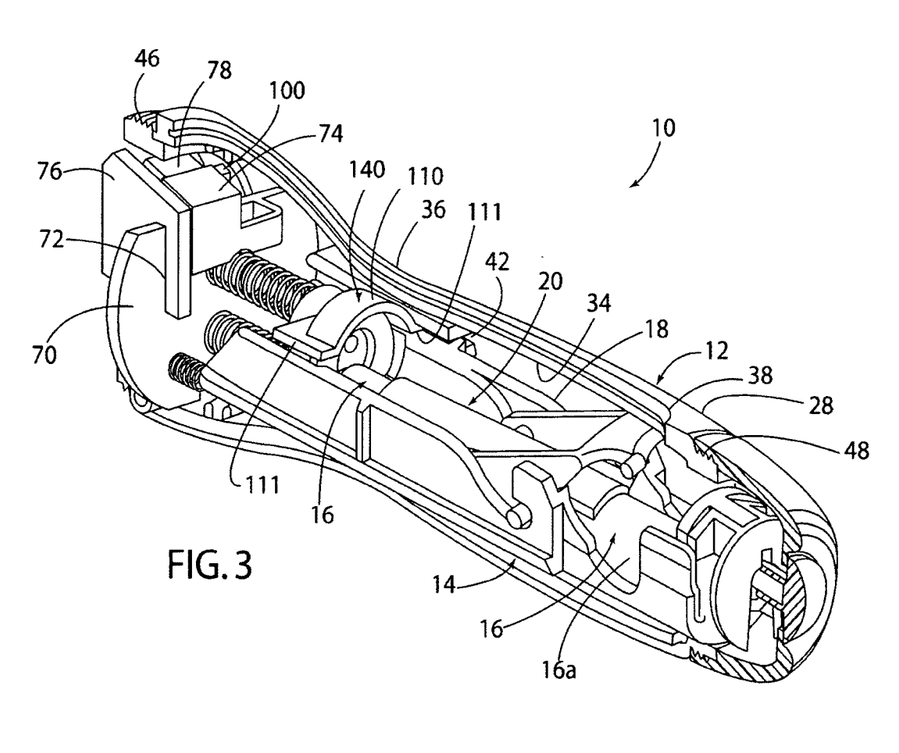
FIG. 3 is an isometric view of a battery powered device of the present invention having a housing partially cut away, a bezel removed and a first battery in an inserted position.
Figure 4:
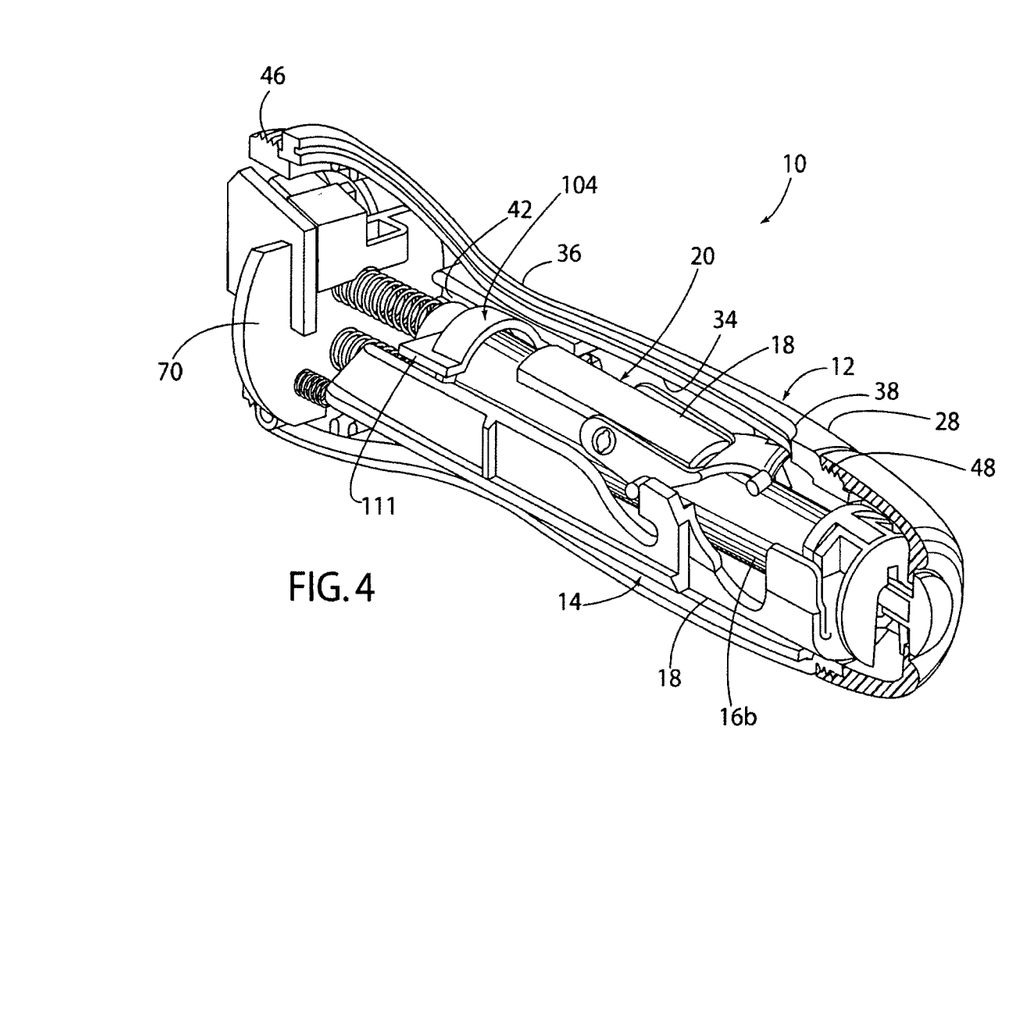
FIG. 4 is an isometric view of the battery powered device of the present invention having the housing partially cut away, the bezel removed and a second battery in the inserted position.
Figure 5:
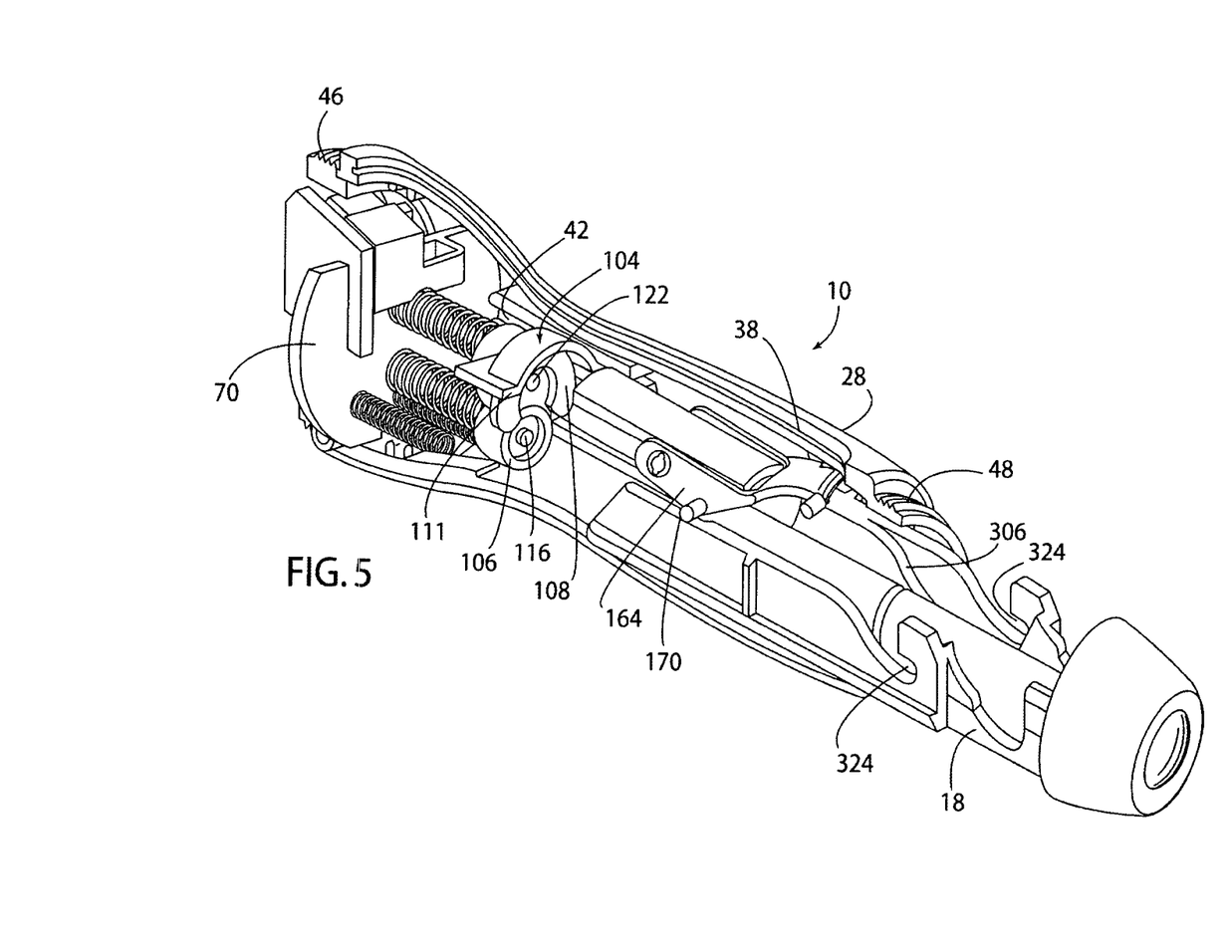
FIG. 5 is an isometric view of the battery powered device of the present invention having the housing partially cut away, the bezel removed and the first battery in the loading position.

The illustrated lamp enclosure 22 is screwed onto the first end outside thread 46 of the housing 12 to connect the lamp enclosure 22 to the housing 12. The illustrated lamp enclosure 22 includes a bezel 50 encircling a concave reflective member 52 and a disk-shaped transparent or translucent cover 54. The bezel 50 includes a first member 58 and a second member 60 clamping the concave reflective member 52 and the cover 54 therebetween. The concave reflective member 52 and the cover 54 of the lamp enclosure 22 are similar to the reflective members and covers or lenses of flashlights found in the prior art. As seen in FIG. 3, the concave reflective member 52 includes a central opening 56 for reception of the lamp 26 connected to the switch assembly 24 therein.

In the illustrated example, the switch assembly 24 has the lamp 26 connected thereto and is used to selectively operate the lamp 26. The switch assembly 24 comprises a substantially circular plate 70 located in the tubular groove 40 in the interior surface 34 of the housing 12. A circular lamp receptacle (not shown) extends forwardly from the substantially circular plate 70 and accepts the lamp 26 therein. The circular plate 70 includes a printed circuit board slot 72 and an adjacent switch housing 74 in an upper portion of the circular plate 70. The printed circuit board slot 72 and the adjacent switch housing 74 are configured to receive a printed circuit board 76 and a slide switch 78, respectively, therein. The printed circuit board 76 includes electrical connections for powering the lamp 26.

The illustrated slide switch 78 includes a slide member 100 for selecting one of several different operating (or off) states of the battery powered device 10 (i.e., selectively opening and closing the circuits of the battery powered device 10). For example, the slide member 100 can be moved to a first position to close the first circuit for powering the battery powered device 10 when AAA batteries 16a are in the housing 12, a second position to close the second circuit for powering the battery powered device when AA batteries 16b are in the housing 12, and an off position. The slide member 100 is connected to the slide tab 66. In the illustrated embodiment, the slide tab 66 is connected to the slide member 100 via a switch connection 102. However, it is contemplated that the slide member 100 could be directly connected to the slide tab 66 or the slide member 100 and the slide tab 66 could be a single integral member.

A rear face 82 (FIG. 2) of the illustrated substantially circular plate 70 includes an upper post 84 having an upper spring 86 surrounding and connected thereto and a middle post 88 having a middle spring 90 surrounding and connected thereto. The upper post 84 and associated upper spring 86 and the middle post 88 and associated middle spring 90 are preferably vertically aligned. The rear face 82 of the substantially circular plate 70 also includes a lower first side post 92 having a first side spring 94 surrounding and connected thereto and a lower second side post 96 having a second side spring 98 surrounding and connected thereto. The lower first side post 92 and associated first side spring 94 and the lower second side post 96 and associated second side spring 98 are preferably horizontally aligned. The springs 90 and 98 are used to complete the first circuit to power the battery powered device 10 and the springs 86 and 94 are used to complete the second circuit to power the battery powered device 10.

In the illustrated example, the switch assembly 24 further includes a front contact member 104 connected to the upper spring 86 and middle spring 90. The front contact member 104 is configured to engage a front of the batteries 16 to close the first and second circuits in the battery powered device 10 (see FIGS. 6 and 8).

Figure 8:
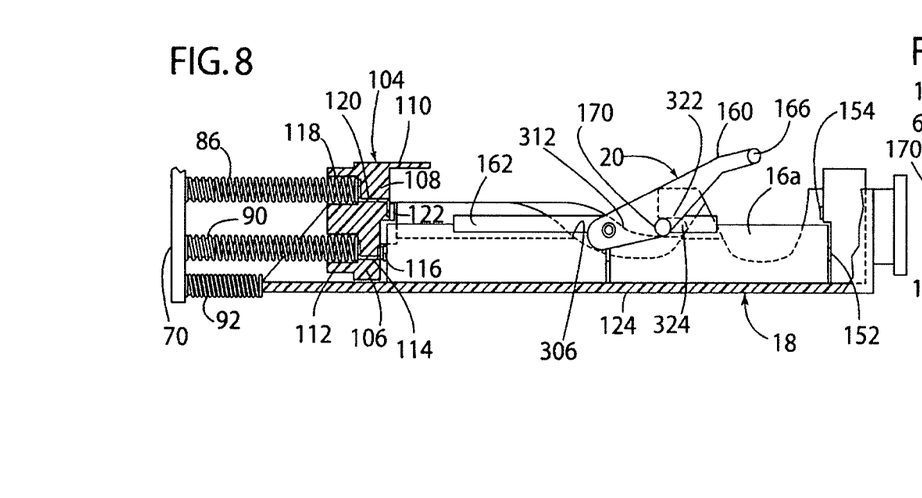
FIG. 8 is a cross-sectional view of a battery carrier and a portion of a switch assembly of the battery powered device of the present invention and a side view of a locking hold down mechanism of the battery powered device of the present invention with the second batteries in the loaded position.

The illustrated front contact member 104 includes a lower cylinder 106, an upper cylinder 108, a top covering flange 110 and a pair of side flanges 111. The lower cylinder 106 includes a front middle spring opening 112 for accepting the middle spring 90 therein. The middle spring 90 is connected to the lower cylinder 106 in the front middle spring opening 112. A wire 114 leads from a lower rear contact 116 centrally located in the rear of the lower cylinder 106 to the middle spring 90. As illustrated in FIG. 8, the AAA-sized batteries 16*a* are configured to contact the lower rear contact 116 to form the first circuit when the battery compartment apparatus 14 is within the housing 12.

Figure 6:
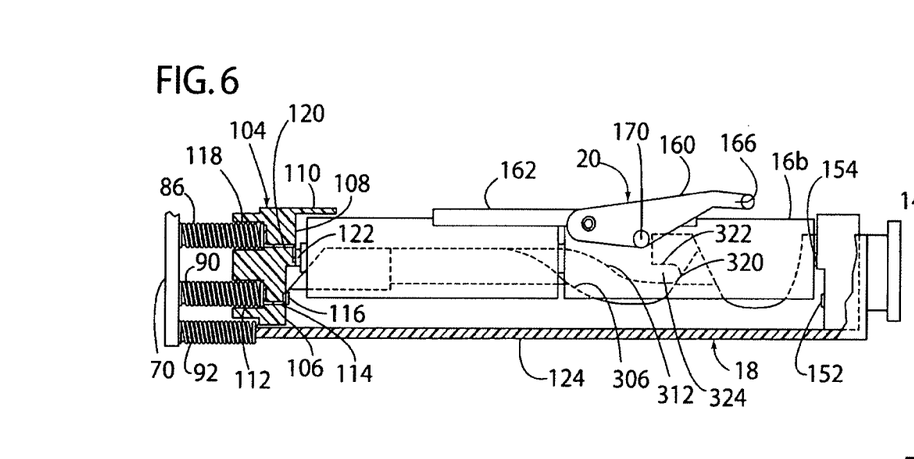
FIG. 6 is a cross-sectional view of a battery carrier and a portion of a switch assembly of the battery powered device of the present invention and a side view of a locking hold down mechanism of the battery powered device of the present invention with the first batteries in the loaded position.

In the illustrated example, the upper cylinder 108 is located on top of the lower cylinder 106. The upper cylinder 108 includes a front upper spring opening 118 for accepting the upper spring 86 therein. The upper spring 86 is connected to the upper cylinder 108 in the front upper spring opening 118. A wire 120 leads from an upper rear contact 122 centrally located in the rear of the upper cylinder 108 to the upper spring 86. As illustrated in FIG. 6, the AA-sized batteries 16*b* are configured to contact the upper rear contact 122 to form the second circuit when the battery compartment apparatus 14 is within the housing 12.

The illustrated top covering flange 110 covers a front portion of the AA-sized batteries 16*b* to maintain the AA-sized batteries 16*b* in position within the housing 12 (see FIG. 6). Likewise, the lower cylinder 106 is recessed within a bottom portion of the upper cylinder 108 as illustrated in FIG. 8 to maintain the AAA-sized batteries 16*a* in position within the housing 12. The side flanges 111 extend into the second set of parallel channels 42 on the interior surface 34 of the housing 12 to allow the front contact member 104 to slide along the second set of parallel channels 42 within the housing 12. As described in more detail below, when the battery compartment apparatus 14 is slid into the housing 12, the batteries 16 push against the front contact member 104 and against the bias of the upper spring 86 and the middle spring 90 to help close the first circuit or the second circuit.

In the illustrated example, the batteries 16 are placed on the battery carrier 18 of the battery compartment apparatus 14 (FIG. 2A) and inserted into the housing 12 to power the battery powered device 10. The battery carrier 18 includes a trough shaped tray 124, a rear contact member 126, a first circuit contact strip 128, a second circuit contact strip 130, and an end cap 132. The trough shaped tray 124 includes an inner surface 134, an outer surface 136, a first end 135 and a second end 137. The outer surface 136 has a pair of opposite flanges 138 configured to slide within the second set of parallel channels 44 on the interior surface 34 of the housing 12 to allow the battery carrier 18 to slide within the housing 12. The outer surface 136 also includes a pair of vertical stops 140 configured to abut against a mating ledge 142 (see FIG. 2) in the interior surface 34 of the housing 12 to prevent the battery carrier 18 from sliding entirely out of the housing 12. Therefore, after withdrawal of a portion of the battery carrier 18 from the housing 12, the first end 135 remains inside the housing 12 and the second end 137 extends beyond the housing 12. The end cap 132 is rotatably connected to the second end 137 of the trough shaped tray 124 by a pin 141. The pin 141 allows the end cap 132 to freely rotate. The end cap 132 includes an inner threaded surface configured to be screwed onto the second end outside thread 48 of the housing 12 to maintain the battery carrier 18 within the housing 12 (see FIGS. 3 and 4).

The illustrated trough shaped tray 124 is configured to accept the batteries 16 on the inner surface 134 thereof. The inner surface 134 includes an arcuate bottom portion 144 configured to accept the batteries 16*a* thereon (see FIG. 7). The inner surface 134 also includes opposite ledges 146 for accepting the batteries 16*b* thereon (see FIG. 8). The opposite ledges 146 are also arcuate and prevent the batteries 16*b* from dropping to the arcuate bottom portion 144.

Figure 9:
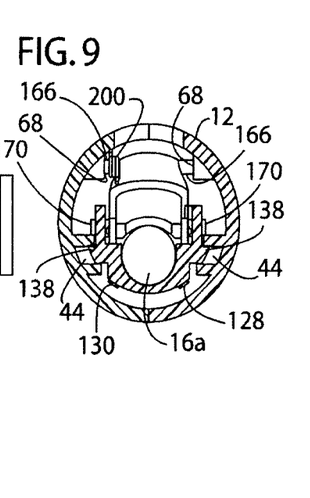
FIG. 9 is a cross-sectional view of the powered device of the present invention with the second batteries in the loaded position.

In the illustrated example, the trough shaped tray 124 includes the rear contact member 126 for contacting a rear of the batteries 16 on the battery carrier 18. The rear contact member 126 includes a lower contact 152 configured to abut a rear of the batteries 16*a* as illustrated in FIG. 8. The lower contact 152 is engaged with a first wire (not shown) extending through the rear contact member 126. The first wire is engaged with the first circuit contact strip 128, which extends along a bottom of the trough shaped tray 124. When the batteries 16*a* are inserted into the battery carrier 18 and the battery carrier 18 is inserted into the housing 12 as illustrated in FIGS. 8 and 9, a front of the batteries presses against the front contact member 104, the first circuit contact strip 128 presses against the first side spring 94 and the second circuit contact strip 130 presses against the second side spring 98. Therefore, the first circuit is substantially closed and the battery powered device 10 only waits for the slide tab 66 to be slid to close the first circuit and thereby power the lamp 26. The first circuit comprises the middle spring 90 connected to the slide switch 78 and the printed circuit board 76 through the circular plate 70, the wire 114 in lower cylinder 106 of the front contact member 104, the lower rear contact 116 of the front contact member 104, the batteries 16*a*, the lower contact 152, the first wire, the first circuit contact strip 128, the second side spring 98, and the lamp 26. Therefore, when the slide switch 78 is moved to close the first circuit (via the slide tab 66 and the switch connection 102), the batteries 16*a* will power the lamp 26 of the battery powered device 10.

Figure 7:
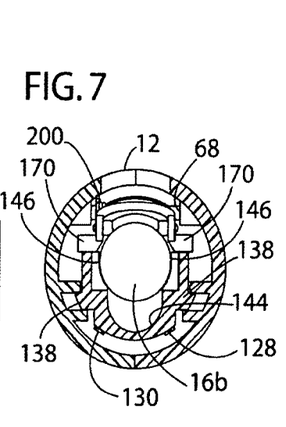
FIG. 7 is a cross-sectional view of the battery powered device of the present invention with the first batteries in the loaded position.

The illustrated rear contact member 126 also includes an upper contact 154 configured to abut a rear of the batteries 16*b* as illustrated in FIG. 6. The upper contact 154 is engaged with a second wire (not shown) extending through the rear contact member 126. The second wire is engaged with the second circuit contact strip 130, which extends along a bottom of the trough shaped tray 124. When the batteries 16*b* are inserted into the battery carrier 18 and the battery carrier 18 is inserted into the housing 12 as illustrated in FIGS. 6 and 7, a front of the batteries presses against the front contact member 104, the first circuit contact strip 128 presses against the first side spring 94 and the second circuit contact strip 130 presses against the second side spring 98. Therefore, the second circuit is substantially closed and the battery powered device 10 only waits for the slide tab 66 to be slid to close the second circuit and thereby power the lamp 26. The second circuit comprises the upper spring 86 connected to the slide switch 78 and the printed circuit board 76 through the circular plate 70, the wire 120 in the upper cylinder 108 of the front contact member 104, the upper rear contact 122 of the front contact member 104, the batteries 16*b*, the upper contact 154, the second wire, the second circuit contact strip 130, the first side spring 94, and the lamp 26. Therefore, when the slide switch 78 is moved to close the second circuit (via the slide tab 66 and the switch connection 102), the batteries 16*b* will power the lamp 26 of the battery powered device 10.

In the illustrated example, the locking hold down mechanism 20 is configured to respond to insertion and withdrawal of the battery carrier 18 into and out of the housing 12 by locking the locking hold down mechanism 20 against the at least one battery 16, thereby preventing undesired displacement of the at least one battery 16 within the housing 12. The locking hold down mechanism 20 comprises a support frame 160 and a retaining member 162 secured to the support frame 160 configured to contact and secure the battery 16 within the battery carrier 18. The support frame 160 comprises a base 163 and a pair of arms 164 extending from the base 163. The base 163 includes a pair of co-linear posts 166 configured to be inserted into the pivot openings 68 in the housing 12 to allow the support frame 160 to pivot about an axis defined by the pivot openings 68. A spring 200 surrounds at least one of the posts 166 and biases the support frame 160 to press an end of the arms 164 downward. The arms 164 extend forwardly from the base 163 and include protrusions 170 that extend outwardly therefrom. The protrusions 170 are configured to abut the battery carrier 18 as explained in more detail below. The arms 164 each have an opening 172 therein. The retaining member 162 includes an arcuate member 174 and a pair of side pivot pins 176. The side pivot pins 176 extend through the openings 172 in the arms 164 of the support frame 160 to pivotally connect the retaining member 162 to the support frame 160. The spring 200 forces the support frame 160 to rotate, and thereby forces the retaining member 162 downward into contact with the batteries 16 as illustrated in FIGS. 6 and 8. The support frame 160 includes a first end that contacts the battery carrier 18 and a second end that pivots about the axis secured within the housing 12.

The illustrated trough shaped tray 124 of the battery carrier 18 includes a pair of inner tracks 300 and a pair of outer tracks 302 for accepting portions of the hold down mechanism 20 thereon to secure the batteries 16 within the housing 12. The pair of inner tracks 300 comprises a first pair of front upper surfaces 304, a first pair of matching inclined surfaces 306 and a first pair of lower surfaces 308. The pair of outer tracks 302 comprises a second pair of front upper surfaces 310, a second pair of matching inclined surfaces 312 and a second pair of lower surfaces 314. The first pair of matching inclined surfaces 306 are closer to the first end 135 of the trough shaped tray 124 and the second pair of matching inclined surfaces 312 are closer to the second end 137 of the trough shaped tray 124. The second pair of matching inclined surfaces 312 terminates at an end wall 320 with an overhang 322 extending therefrom. The second pair of matching inclined surfaces 312, the end walls 320 and the overhangs 322 cooperate to define closed end slots 324.

In the illustrated example, a front portion of the arms 164 ride on the pair of inner tracks 300 and the protrusions 170 extending from the arms 164 ride on the pair of outer tracks 302 as the battery carrier 18 is slid into the housing 12. When AA-size batteries 16*b* are placed on the trough shaped tray 124 of the battery carrier 18 and the battery carrier 18 is inserted into the housing 12, the protrusions 170 will first slide along the first pair of front upper surfaces 304 of the pair of inner tracks 300 and the second pair of front upper surfaces 310 of the outer tracks 302. As the battery carrier 18 is fully inserted into the housing 12 as illustrated in FIG. 6, the top of the batteries 16*b* will prevent the front portion of the arms 164 and the protrusions 170 from sliding down the first pair of matching inclined surfaces 306 and the second pair of matching inclined surfaces 312, respectively. Furthermore, the spring 200 will bias the retaining member 162 downward as discussed above to hold the batteries 16*b* down and on the trough shaped tray 124 of the battery carrier.

When AAA-size batteries 16*a* are placed on the trough shaped tray 124 of the battery carrier 18 and the battery carrier 18 is inserted into the housing 12, the protrusions 170 will once again slide first along the first pair of front upper surfaces 304 of the pair of inner tracks 300 and the second pair of front upper surfaces 310 of the outer tracks 302. However, as the battery carrier 18 is fully inserted into the housing 12 as illustrated in FIG. 8, the arms 164 will slide downwardly on the first pair of matching inclined surfaces 306 and the protrusions 170 will slide downwardly on the second pair of matching inclined surfaces 312. Furthermore, the spring 200 will bias the retaining member 162 downward as discussed above to hold the batteries 16*a* down and on the trough shaped tray 124 of the battery carrier. When the battery carrier 18 is fully inserted into the housing 12, the protrusions 170 will slide into the closed end slots 324 and be captured under the overhangs 322.

Therefore, the battery powered device 10 of the present invention is configured to be powered by alternatively using two separate sets of batteries 16. The first and second batteries are different sizes and cannot be simultaneously contained within the housing 12. While AA-size and AAA-size batteries have been described as being used in the battery powered device 10, it is contemplated that any two size batteries could be used in the battery powered device 10. Furthermore, it is contemplated that the battery powered device could be configured to accept three or more sizes of batteries therein (e.g., by having three or more tracks on the trough shaped tray and corresponding additional projections on the locking hold down mechanism). The battery powered device 10 allows for greater flexibility in choosing batteries 16 to use in the battery powered device 10 and allows for use of the battery powered device 10 with whatever batteries 16 are currently on hand and accessible.

Moreover, the foregoing detailed description is considered that of a preferred embodiment only, and the particular shape and nature of at least some of the components in this embodiment are at least partially based on manufacturing advantages and considerations as well as on those pertaining to assembly and operation. Modifications of this embodiment may well occur to those skilled in the art and to those who make or use the invention after learning the nature of this preferred embodiment, and the invention lends itself advantageously to such modification and alternative embodiments. Therefore, it is to be understood that the embodiment shown in the drawings and described above is provided principally for illustrative purposes and should not be used to limit the scope of the invention.

What is claimed is:

1. A device comprising:
   a housing having a battery compartment disposed therein;
   upper contacts and lower contacts disposed within the battery compartment, the upper contacts comprising an upper front contact and an upper rear contact and the lower contacts comprising a lower front contact and a lower rear contact;
   a first circuit coupled to the upper front contact and the upper rear contact, the first circuit comprising an upper spring electrically connected to a switch and the upper front contact and a first contact strip electrically connected to the upper rear contact, wherein the first circuit corresponds to a first battery size;
   a second circuit coupled to the lower front contact and the lower rear contact, the second circuit comprising a lower spring electrically connected to the switch and the lower front contact and a second contact strip electrically connected to the lower rear contact, wherein the second circuit corresponds to a second battery size;
   wherein power is received from only one of the first circuit and the second circuit; and
   the switch coupled to the first circuit and the second circuit for selecting power from one of the first circuit and the second circuit; and
   wherein the first battery size is different from the second battery size.

2. The device of claim 1, further comprising a load that receives power from one of the first and second circuits.

3. The device of claim 2, wherein the load is a lamp.

4. The device of claim 2, wherein the load is a power tool.

5. The device of claim 1, further comprising an inserted battery, wherein the battery electrically connects to one of the upper contacts and the lower contacts according to a size of the inserted battery.

6. The device of claim 5, wherein the size of the inserted battery is the first battery size.

7. The device of claim 1, wherein the battery compartment comprises a trough shaped tray having an inner surface, an outer surface, a first end and a second end, wherein the trough shaped tray comprises a first pair of matching inclined surfaces and a second pair of matching inclined surfaces, the first pair of matching inclined surfaces are closer to the first end of the trough shaped tray and the second pair of matching inclined surfaces are closer to the second end of the trough shaped tray, wherein the second pair of matching inclined surfaces terminate at an end wall with an overhang extending therefrom.

8. The device of claim 7, wherein the battery compartment further comprises a locking hold down mechanism configured to respond to insertion and withdrawal of the battery carrier into and out of the housing.

9. A lighting device comprising:
   a housing;
   a lamp disposed within the housing;
   a battery compartment disposed within the housing;
   upper contacts and lower contacts disposed within the battery compartment;
   a first circuit coupled to the upper contacts, the first circuit comprising an upper spring electrically connected to a switch and an upper front contact and a first contact strip electrically connected to the upper rear contact, wherein the first circuit corresponds to a first battery size;
   a second circuit coupled to the lower contacts, the second circuit comprising a lower spring electrically connected to the switch and a lower front contact and a second contact strip electrically connected to a lower rear contact, wherein the second circuit corresponds to a second battery size; and
   the switch that connects one of the first circuit and the second circuit to the lamp;
   wherein power is received from only one of the first circuit and second circuit; and
   wherein the first battery size is different from the second battery size.

10. The device of claim 9, wherein the switch is operable to disconnect the lamp from the first and second circuits.

11. The device of claim 9, wherein the switch is moved to connect the lamp to the second circuit.

12. The device of claim 9, wherein the first circuit further comprises a middle spring biased for the first battery size.

13. The device of claim 12, wherein the second circuit further comprises an upper spring biased for the second battery size.

14. The device of claim 9, wherein the first battery size is AAA and the second battery size is AA.

15. The device of claim 9, wherein the battery compartment comprises a trough shaped tray having an inner surface, an outer surface, a first end and a second end, wherein the trough shaped tray comprises a first pair of matching inclined surfaces and a second pair of matching inclined surfaces, the first pair of matching inclined surfaces are closer to the first end of the trough shaped tray and the second pair of matching inclined surfaces are closer to the second end of the trough shaped tray, wherein the second pair of matching inclined surfaces terminate at an end wall with an overhang extending therefrom.

16. The device of claim 15, wherein the battery compartment further comprises a locking hold down mechanism configured to respond to insertion and withdrawal of the battery carrier into and out of the housing.

* * * * *